(12) United States Patent
Fuerst et al.

(10) Patent No.: US 9,067,364 B2
(45) Date of Patent: Jun. 30, 2015

(54) COATED FABRIC FROM MONOAXIALLY DRAWN PLASTIC TAPES AND BAG PRODUCED THEREFROM

(75) Inventors: Herbert Fuerst, Weissenbach/Triesting (AT); Peter Skopek, Klosterneuburg (AT)

(73) Assignee: STARLINGER & CO GESELLSCHAFT M.B.H. (AT)

( * ) Notice: Subject to any disclaimer, the term of this patent is extended or adjusted under 35 U.S.C. 154(b) by 821 days.

(21) Appl. No.: 12/677,268

(22) PCT Filed: Jul. 18, 2008

(86) PCT No.: PCT/AT2008/000262
§ 371 (c)(1),
(2), (4) Date: Apr. 6, 2010

(87) PCT Pub. No.: WO2009/033196
PCT Pub. Date: Mar. 19, 2009

(65) Prior Publication Data
US 2010/0209024 A1    Aug. 19, 2010

(30) Foreign Application Priority Data
Sep. 10, 2007 (AT) .............................. GM537/2007 U

(51) Int. Cl.
*B32B 5/02*        (2006.01)
*B32B 27/04*       (2006.01)
(Continued)

(52) U.S. Cl.
CPC .......... *B29C 66/83413* (2013.01); *B29C 65/02* (2013.01); *B29C 65/08* (2013.01); *B29C 65/10* (2013.01); *B29C 65/103* (2013.01); *B29C 65/14* (2013.01); *B29C 65/1412* (2013.01);
(Continued)

(58) Field of Classification Search
CPC .......... B32B 5/00; B32B 5/022; B32B 7/045; B32B 27/04; B32B 27/32; B32B 2307/516
USPC .......... 442/60, 149, 170, 171, 185, 186, 150; 156/73.1, 272.2, 275.1; 383/105, 107
See application file for complete search history.

(56) References Cited

U.S. PATENT DOCUMENTS 2,465,374 A    3/1949 Haman et al.
3,294,616 A    12/1966 Linsley et al.
(Continued)

FOREIGN PATENT DOCUMENTS

AT    388896      9/1989
AT    388896 B    9/1989
(Continued)

OTHER PUBLICATIONS

Novel joining methods applicable to textiles and smart garments, I.A. Jones and R. J. Wise, 2005.
(Continued)

*Primary Examiner* — Jeremy R Pierce
(74) *Attorney, Agent, or Firm* — Workman Nydegger

(57) ABSTRACT

A coated fabric includes a fabric from monoaxially drawn polymer tapes, in particular polyolefin or polyester tapes, preferably polypropylene or polyethylene terephthalate tapes. The fabric is coated with a sealing layer from a thermoplastic synthetic material the melting point of which is below the crystallite melting point of the fabric tape material. The coated fabric is excellently suitable for hot-air, ultrasonic, heated tool, infrared or laser beam welding.

24 Claims, 2 Drawing Sheets

(51) Int. Cl.

| | | |
|---|---|---|
| *B32B 27/02* | (2006.01) | |
| *D03D 15/00* | (2006.01) | |
| *B29C 65/00* | (2006.01) | |
| *B65D 33/00* | (2006.01) | |
| *B65D 30/00* | (2006.01) | |
| *B29C 65/02* | (2006.01) | |
| *B29C 65/10* | (2006.01) | |
| *B32B 27/12* | (2006.01) | |
| *B65D 30/24* | (2006.01) | |
| *B65D 75/12* | (2006.01) | |
| *D06N 3/00* | (2006.01) | |
| *D06N 3/04* | (2006.01) | |
| *F01P 3/02* | (2006.01) | |
| *F02F 1/24* | (2006.01) | |
| *F02F 1/40* | (2006.01) | |
| *B29C 65/08* | (2006.01) | |
| *B29C 65/14* | (2006.01) | |
| *B29C 65/16* | (2006.01) | |
| *B29C 65/18* | (2006.01) | |
| *B29C 35/08* | (2006.01) | |
| *B29K 23/00* | (2006.01) | |
| *B29K 67/00* | (2006.01) | |
| *B29K 101/12* | (2006.01) | |
| *B29L 9/00* | (2006.01) | |
| *B29L 31/00* | (2006.01) | |

(52) U.S. Cl.
CPC ............... *B29C 65/16* (2013.01); *B29C 65/18* (2013.01); *B29C 66/0342* (2013.01); *B29C 66/7292* (2013.01); *B29C 66/90* (2013.01); B29C 2035/0822 (2013.01); B29K 2023/06 (2013.01); B29K 2023/0633 (2013.01); B29K 2023/083 (2013.01); B29K 2023/12 (2013.01); B29K 2067/00 (2013.01); B29K 2101/12 (2013.01); B29K 2995/0051 (2013.01); B29L 2009/00 (2013.01); B29L 2031/7128 (2013.01); *B32B 5/02* (2013.01); *B32B 27/12* (2013.01); *B65D 31/14* (2013.01); *B65D 75/12* (2013.01); *D06N 3/0002* (2013.01); *D06N 3/045* (2013.01); *F01P 3/02* (2013.01); *F01P 2003/028* (2013.01); *F02F 1/242* (2013.01); *F02F 1/40* (2013.01); *B29C 66/71* (2013.01); *B29C 66/73712* (2013.01); *B29C 66/9141* (2013.01); *B29C 66/91411* (2013.01); *B29C 66/81417* (2013.01); *B29C 66/91935* (2013.01)

(56) References Cited

U.S. PATENT DOCUMENTS

| | | | |
|---|---|---|---|
| 3,535,184 A | | 10/1970 | Schwartz |
| 3,660,150 A | | 5/1972 | Cooper |
| 4,161,559 A | | 7/1979 | Bosse |
| 4,373,979 A | | 2/1983 | Planeta |
| 5,082,744 A | * | 1/1992 | Akao et al. ............... 428/522 |
| 5,462,807 A | | 10/1995 | Halle et al. |
| 5,517,005 A | | 5/1996 | Westerberg et al. |
| 5,578,370 A | * | 11/1996 | Ferrar et al. .............. 442/186 |
| 5,645,933 A | * | 7/1997 | Sakazume et al. ........ 442/290 |
| 5,845,995 A | * | 12/1998 | Starlinger Huemer ..... 383/125 |
| 6,716,499 B1 | | 4/2004 | Vadhar |
| 6,893,696 B2 | | 5/2005 | Hansen et al. |
| 7,318,961 B2 | | 1/2008 | Loos et al. |

FOREIGN PATENT DOCUMENTS

| | | |
|---|---|---|
| CN | 1131404 | 9/1996 |
| CN | 1147233 | 4/1997 |
| CN | 1529655 | 9/2004 |
| DE | 2027 060 | 12/1970 |
| DE | 2027060 | 12/1970 |
| DE | 3236770 | 10/1982 |
| DE | 3236770 A1 | 6/1983 |
| DE | 4137310 | 5/1993 |
| EP | 0 769 585 A2 | 4/1997 |
| EP | 0769585 | 4/1997 |
| EP | 0997222 | 5/2000 |
| GB | 1265755 | 3/1972 |
| JP | 10035621 | 2/1998 |
| JP | 11227050 | 8/1999 |
| JP | 09502669 | 5/2001 |
| JP | H09512518 | 3/2002 |
| JP | 2002200718 | 7/2002 |
| JP | 2006526552 | 11/2006 |
| JP | 2009107632 | 5/2009 |
| JP | 2009133022 | 6/2009 |
| RU | 2065550 | 5/1989 |
| RU | 2135338 | 8/1999 |
| SU | 1574386 | 9/1978 |
| WO | WO9505942 | 3/1995 |
| WO | 95/30598 | 11/1995 |
| WO | 01/05671 | 1/2001 |
| WO | 01/05671 A1 | 1/2001 |
| WO | WO2006004750 | 1/2006 |

OTHER PUBLICATIONS

Wikipedia German: Polyethylen (see Wikipedia English)—Jun. 6, 2013.
Carlowitz, Bodo "Kunststoff-Tabellen" (no abstract available) 1995.
Fabrene Datasheet, Fabrene Industrial Synthetic Fabrics, Jul. 14, 2000, Canada.

\* cited by examiner

COATED FABRIC FROM MONOAXIALLY DRAWN PLASTIC TAPES AND BAG PRODUCED THEREFROM

The invention relates to a coated fabric from monoaxially drawn plastic tapes according to the preamble of claim 1.

Furthermore, the invention relates to a process for bonding coated fabrics from monoaxially drawn plastic tapes.

Finally, the invention relates to a bag made of a coated fabric from plastic tapes.

Fabrics from monoaxially drawn plastic tapes have found multiple applications in the packaging industry, for example, for the production of packaging bags. Such packaging bags, which are shaped as box bags, are known, for example, from document WO 95/30598 A1. The fabric therein consists of monoaxially drawn polymer tapes, especially polyolefin, preferably polypropylene tapes, wherein the fabric can be coated with a thermoplastic synthetic material, in particular polyolefin, on one or both surfaces. The fabric is either a tubular circular fabric produced on a circular loom or a flat fabric bonded to form a tube via a longitudinal weld or bonded seam.

Using the above-described fabric from monoaxially drawn plastic tapes as a bag body, a bag is produced according to WO 95/30598 A1 by shaping at least one end of the bag body into a rectangular bottom area by folding the fabric ends, which bottom area is bonded to a cover sheet made of a fabric from monoaxially drawn polymer tapes via an interlayer of a thermoplastic synthetic material, in particular a polyolefin or polypropylene material, respectively, by the exertion of heat, with the exertion of heat occurring such that less than 30% of the material thickness of the fabric tapes of the bottom area and of the cover sheet exhibit disoriented polymer molecules due to said exertion of heat, but the molecular orientation continues to exist in the remaining material area. Instead of a separate cover sheet, a folding tab of the bag body fabric which overlaps the bottom area can also serve as a cover sheet.

Bags made of such a fabric for which the above conditions for bonding the bottom area to the cover sheet are met have proved their worth for the packaging of all kinds of bulk materials millions of times all over the world for more than one decade.

However, it has turned out to be crucial that weld seams which meet all strength requirements can be produced only if temperature and processing speed are observed precisely.

In addition, when such fabrics are welded, it must be made sure that the plastic tapes are not heated above their crystallite inciting point. The reason for this is that a fabric which is uncoated or coated with a single layer loses its high strength in the seam area during heated tool welding or ultrasonic welding, since the monoaxial orientation of the drawn tapes gets lost by the required welding temperature.

The present invention is based on the problem of providing a coated fabric which is easier to weld than the known fabric made of monoaxially drawn plastic tapes, but still provides a high strength of the welded joint. In particular, the new coated fabric should be weldable by ultrasonic welding or heated tool welding and should largely maintain a high fabric strength in the seam area also with those welding processes. Such a coated fabric from monoaxially drawn plastic tapes would be usable also in a so-called form, fill and seal (FFS) process.

The invention solves the problem by providing a coated fabric having the characterizing features of claim 1, by a process for bonding coated fabrics having the characterizing features of claim 8 as well as by a bag having the characterizing features of claim 13. Advantageous embodiments of the invention are presented in the subclaims.

According to the invention, a fabric from monoaxially drawn polymer tapes, in particular polyolefin or polyester tapes, preferably polypropylene or polyethylene terephthalate tapes, is coated with a sealing layer from a thermoplastic synthetic material the melting point of which is below the crystallite melting point of the fabric tape material. Such a coated fabric is excellently suitable for welding, wherein the exertion of heat does not have to occur from the side of the sealing layer, but heat can be introduced into the sealing layer through the fabric from monoaxially drawn polymer tapes, provided that the fabric from monoaxially drawn polymer tapes is not heated beyond the crystallite melting point of the fabric tape material. The weld seams produced exhibit high strength.

In document WO 95/30598, coated embodiments of the fabric as well as their connection to each other are also disclosed. For example, FIG. 9 shows a variant in which a cover sheet made of a tape fabric and a coating of polyolefins, e.g., polypropylene, are to be bonded to each other with a bag tab consisting of a tape fabric and a coating of the same polyolefin material. For this purpose, the coating sides facing each other are heated for plastification down to a penetration depth of 2-40 μm and pulled through two cooled rolls, whereby the layers 3b, 4b are pressed to each other. The cooled pair of rolls provides the required cooling so that the tape fabric does not sustain any damage caused by heat. Since the heating occurs from the coating side, mainly the coating is heated, and, thus, the tapes lose the orientation of their molecular chains only down to a low depth. The welding by heating a fabric coating as described above may also be performed if only one of the fabrics is coated, as shown in FIG. 12 of WO 95/30598. In doing so, an uncoated fabric is tightly bonded to a fabric which has a coating by heat welding.

In WO 95/30598, it is also mentioned that a copolymer of ethylene and vinyl acetate, which is generally known as EVA, can be added to the coating of the fabric consisting of a thermoplastic synthetic material, in particular a polyolefin material. Said EVA has a lower melting point than polyethylene. By adding EVA, the weldability of the coating is noticeably improved. However, further details on the proportion of the addition of EVA as well as melting points cannot be found in this document. In particular, it obviously has not been considered to add such an amount of EVA that the melting point of the coating will be below the crystallite melting point of the fabric tape material, since only in that case welding could occur also from the fabric side, which is not contemplated at all in WO 95/30598.

A problem which arises when the sealing layer is provided on the fabric from monoaxially drawn polymer tapes according to the invention is that, in most cases, said sealing layer adheres very poorly to the fabric from monoaxially drawn polymer tapes. In particular, pure polyethylene, which has a sufficiently low melting point, does not adhere to tapes produced from polypropylene. In order to be able to use not only special materials for the sealing layer which are indeed available on the market and exhibit both sufficient adhesion on the tape material and a sufficiently low melting point, in one embodiment of the invention it is envisaged to arrange an adhesive layer made of a polymer material with a good adhesion both to the fabric and to the sealing layer between the fabric from monoaxially drawn polymer tapes and the sealing layer. For an improved manageability during welding, the adhesive layer should preferably exhibit a melting point which is above that of the sealing layer.

A further embodiment of the coated fabric according to the invention provides large degrees of freedom in the course of the adjustment of the process parameters for welding. In this embodiment the fabric tape material has a crystallite melting temperature of more than 120° C.

In an inexpensive, but still good embodiment of the coated fabric according to the invention, the sealing layer comprises polyethylene which has a low melting point. Alternatively, the sealing layer is designed as a special polymer layer having a low melting point, made, e.g., of the product Surlyn® 1652-E, which is produced by the firm DuPont. This product is admittedly more expensive than a polyethylene layer, but requires no adhesive layer for adhering to the fabric from monoaxially drawn polymer tapes.

In a preferred embodiment of the invention, the adhesive layer comprises polypropylene which binds very well to the tape material. Polyethylene of up to 40% by volume, preferably of up to 20% by volume, can thereby be added to the polypropylene.

For the processability and a sufficient strength of the coated fabric, it has turned out to be advantageous if the drawn polymer tapes have a thickness between 20 μm and 80 μm. Furthermore, it is preferred that the sealing layer and optionally the adhesive layer have, each have a thickness between 5 μm and 60 μm.

The invention also comprises a process for bonding coated fabrics according to the invention by a welding process. In doing so, two coated fabrics are placed on top of each other such that the sealing layers face each other. At least one of the fabrics is heated from the fabric side, i.e., from outside, to a temperature below the crystallite melting temperature of the fabric tape material, for a time period until the melting of the sealing layers occurs, which interconnect during melting. The connection of the melted sealing layers may occur under application of pressure which is exerted either directly by the welding elements or by separate pressure generating means such as a pair of rolls, which, at the same time, can be cooled. In doing so, heating may occur by means of an ultrasonic actuator, i.e., by ultrasonic welding, by means of a heating element, i.e., by heated tool welding, by means of an infrared radiator, i.e., by infrared welding, or by means of a laser beam source, i.e., by laser beam welding.

The invention also comprises a bag with a bag body and a cover sheet each of them made of a coated fabric according to the invention, which are in an area bonded to each other by hot-air welding or the like so that the tapes of the fabrics will have maintained the orientation of their molecular chains.

The invention is now illustrated in further detail on the basis of non-limiting exemplary embodiments, with reference to the drawings. In the drawings.

Figure 1:
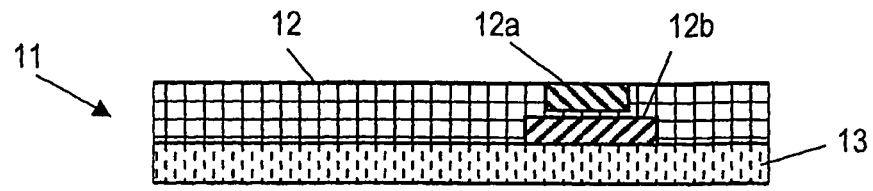
FIG. 1 shows a first embodiment of a coated fabric according to the invention in cross-section.

In FIG. 1, a first embodiment of a coated fabric 11 according to the invention is illustrated in cross-section. Said coated fabric 11 comprises a fabric 12 from monoaxially drawn polymer tapes 12a, 12b, in particular polyolefin or polyester tapes, preferably polypropylene or polyethylene terephthalate tapes. The polymer tapes 12a, 12b illustrated by way of example form the warp and weft of the fabric 12. The tape fabric 12 is coated with a sealing layer 13 from a thermoplastic synthetic material the melting point of which is below the crystallite melting point of the fabric tape material. For example, the tapes 12a, 12b consist of polypropylene, which typically has a crystallite melting point of above 160° C. In a first variant, the sealing layer 13 comprises polyethylene the melting point of which is approx. 105° C. (LD-PE). Polyethylene has the disadvantage that it adheres poorly to polypropylene. A possibility of eliminating this drawback is demonstrated in the second embodiment of a coated fabric according to the invention, which is described below with reference to FIG. 2. However, special polymers which exhibit a low melting point and adhere properly to polypropylene are also suitable as an alternative to polyethylene as a sealing layer 13. For example, the product Surlyn® 1652-E, which is produced by the firm DuPont, has proved to be a suitable special polymer. Its melting point is approx. 100° C.

Figure 2:
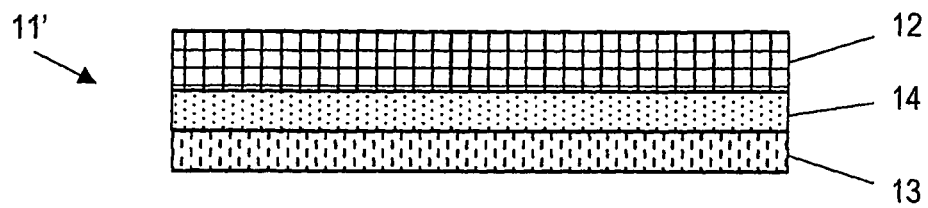
FIG. 2 shows a second embodiment of a coated fabric according to the invention in cross-section.

In FIG. 2, a second embodiment of a coated fabric 11' according to the invention is illustrated, which likewise comprises a fabric 12 from monoaxially drawn polymer tapes, in particular polyolefin or polyester tapes, preferably polypropylene or polyethylene terephthalate tapes, as well as a sealing layer 13 from a thermoplastic synthetic material the melting point of which is below the crystallite melting point of the fabric tape material. The present embodiment of the coated fabric 11' differs from the above first embodiment only in that an additional adhesive layer 14 made of a polymer material with a good adhesion both to the fabric 12 and to the sealing layer 13 is arranged between the fabric 12 from monoaxially drawn polymer tapes and the sealing layer 13. Preferably, the adhesive layer 14 has a melting point which is above that of the sealing layer 13. Preferably, the adhesive layer 14 comprises polypropylene to which polyethylene of up to 40% by volume, preferably of up to 20% by volume, is added.

The coated fabrics 11, 11' according to the invention are excellently suitable for interconnecting by welding, wherein the welded joint produced exhibits high strength. Thus, they are particularly well suited for use in the production of bags, in particular box bags or box valve bags, as described in WO 95/30598. However, in contrast to the fabrics disclosed in WO 95/30598, they are also very well suited for ultrasonic welding, heated tool welding, infrared welding or laser beam welding. Using one of those welding processes, a flat fabric can, for example, be bonded in the longitudinal direction to form a circular fabric. Another field of application of the coated fabrics according to the invention is the form, fill and seal (FFS) process.

Figure 3:
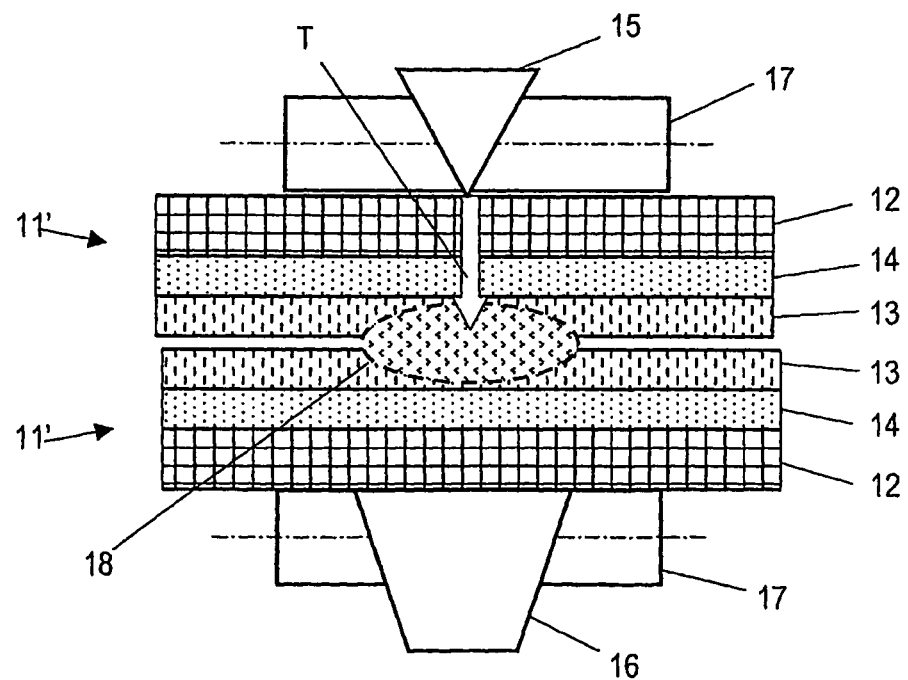
FIG. 3 shows a schematic illustration of a welding process according to the invention on two coated fabrics according to the invention.

On the basis of FIG. 3, the interwelding of two of the coated fabrics 11' depicted in FIG. 2 is now illustrated schematically. At first, the two coated fabrics 11', 11' are placed on top of each other such that their sealing layers 13, 13 face each other. Then, at least one of the coated fabrics 11', 11' is heated from the side of the fabric 12 from monoaxially drawn polymer tapes, i.e., from outside, to a temperature (arrow T) which is below the crystallite melting temperature of the fabric tape material, using at least one welding element 15, 16. The supply of heat occurs until the sealing layers 13 are caused to melt and, in doing so, tightly bond to each other, as indicated by the area 18 with a dashed line. The connection of the melted sealing layers 13, 13 is effected by a cooled pair of rolls 17, 17 applying pressure. However, the application of pressure might occur also directly via the welding elements 15, 16. For the sake of a better understanding, it should be noted that the two coated fabrics 11', 11' can be moved through the welding elements 15, 16 during the welding process also at a uniform speed, namely, with reference to FIG. 3, out of the drawing plane. If the welding process is configured as ultrasonic welding, the welding element 15 is designed as an ultrasonic actuator and the welding element 16 as a counterpart is shaped in the form of an anvil. If the welding process is configured as heated tool welding, the welding element 15 is designed as a heating element, and the welding element 16 is designed either also as a heating element or as a bearing. If the welding process is configured as infrared or laser beam welding, the welding element 15 is designed as an infrared radiator or a laser beam source.

Figure 5:
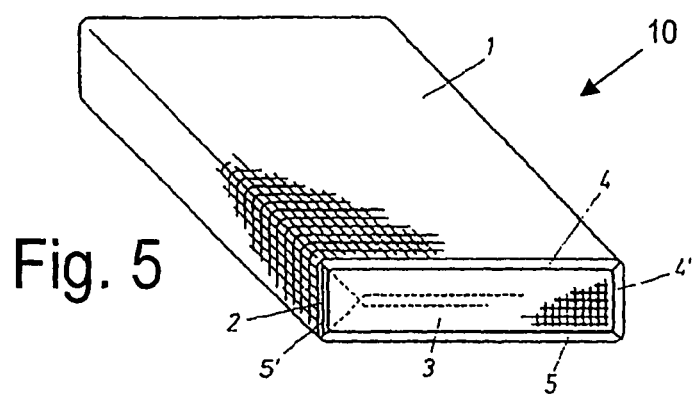
FIG. 5 shows, in perspective view, a bag according to the invention made of a coated circular fabric.

FIG. 5 shows a bag 10 according to the invention having a box shape. The bag 10 consists of a bag body 1 made of the above described 2-layered or 3-layered coated fabric 11, 11' (see FIGS. 1 and 2) according to the present invention. In this embodiment, the coated fabric is designed as a circular fabric. The end faces, i.e., the bottom and top areas of said box bag, are formed by folding tabs 4, 4', 5, 5' of the bag body 1. As indicated with dashed lines, the tabs 4 and 5 project above each other only slightly. Furthermore, a valve 2 is arranged between the tabs 5' and 4 and 5, respectively, which valve consists of sheet-like or tubular materials such as fabrics or films and by means of which the bag is filled. If the bag 10 is filled, the valve 2 closes by the pressure the filling material exerts against the end face. A cover sheet 3, which likewise consists of the 2-layered or 3-layered coated fabric 11, 11' according to the invention, is welded onto the tabs 4, 5. Either the hot-air welding process as described further below or one of the above-described welding processes, namely ultrasonic, heated tool, infrared or laser beam welding, is provided for this purpose. The specific characteristic of the bag 10 according to the invention is that, after the cover sheet 3 has been welded on, the molecular chains in the tapes essentially maintain their orientation, since only the sealing layer 13 and optionally the adhesive layer 14 are (entirely or partially) melted. Therefore, the bag 10 exhibits a phenomenal strength.

Figure 6:
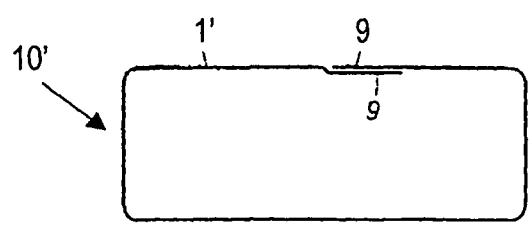
FIG. 6 shows a bag according to the invention made of a coated flat fabric with a longitudinal seam.

In FIG. 6, a further embodiment of a bag 10' according to the invention is illustrated. It differs from the variant shown in FIG. 5 mainly in that, as a bag body 1', a flat fabric has been formed into a tube by bonding its longitudinal edges 9, 9 to a longitudinal weld or bonded seam.

Figure 4:
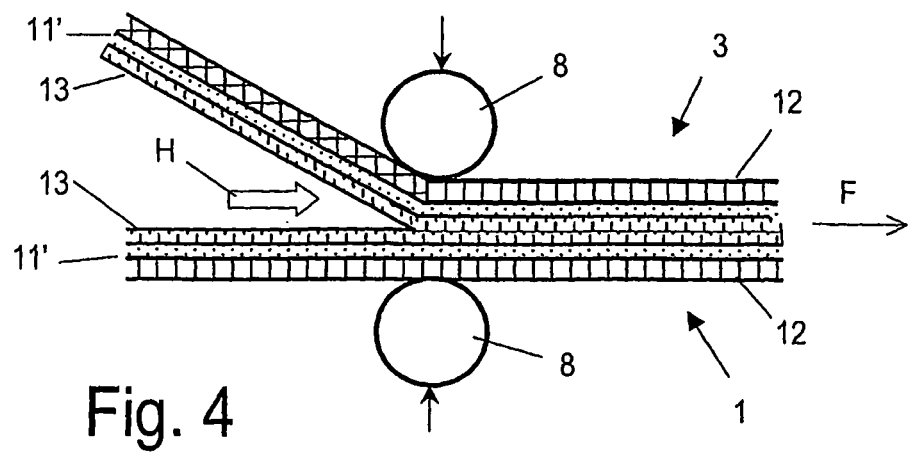
FIG. 4 shows a schematic illustration of a hot-air welding process on two fabrics according to the invention.

The hot-air welding process for bonding the end face of the bag body 1 to the cover sheet 3 is schematically illustrated in FIG. 4. In this exemplary embodiment, the bag body 1 and the cover sheet 3 consist of a 3-layered coated fabric 11', as illustrated in FIG. 2. The cover sheet 3 is supplied to the bag body 1, while both are pulled in direction F through a cooled pair of rolls 8, 8 which press against each other. Hot air H is injected via a nozzle, which is not illustrated, between the bag body 1 and the cover sheet 3. The hot air causes the sealing layers of the coated fabrics 11', 11', which face each other, to melt. The temperature of the hot air H and the conveying rate F are adjusted such that the sealing layers 13, 13 of the two coated fabrics 11', 11' will indeed melt, and optionally also the adhesive layers 14 (see FIG. 2), but not the tapes of the fabrics 12, 12 (or only to a negligible extent, respectively). The melted sealing layers 13, 13 bond by the contact pressure of the two rolls 8, 8 and are simultaneously cooled by the cooling of the rolls 8, 8 so that the tapes of the fabrics 12, 12 are not melted.

Since, thus, the tapes do not or hardly lose the orientation of their molecular chains, no noticeable loss of strength occurs due to the hot-air welding process.

The invention claimed is:

1. A multi-layer coated fabric comprising:
a first coated fabric layer bonded with a second coated fabric layer and having an inner welded seam of controlled size or shape determined at least in part by the application of welding elements to the outer surfaces of said first and second coated fabric layers,
wherein said first and second coated fabric layers each comprises a fabric formed from a monoaxially drawn polymer tape,
wherein each of said first and second fabric layers includes a sealing layer formed from a thermoplastic synthetic material, the melting point of which is below a crystallite melting point of a fabric tape material of the monoaxially drawn polymer tape,
wherein said multi-layer coated fabric is formed by placing said first and second coated fabric layers adjacent to each other with the sealing layers facing each other followed by forming said welded seam of controlled size or shape by applying heat to outer surfaces of said first and second coated fabric layers by welding elements heated to a temperature below the crystallite melting point of the fabric tape material until the two adjacent sealing layers melt together.

2. A multi-layer coated fabric according to claim 1, wherein each fabric formed from a monoaxially drawn polymer tape comprises a polyolefin or polyester tape.

3. A multi-layer coated fabric according to claim 1, wherein each fabric formed from a monoaxially drawn polymer tape comprises a polypropylene or polyethylene terephthalate tape.

4. A multi-layer coated fabric according to claim 1, wherein the size and shape of the inner welded seam is further determined by the application of pressure generating means to the outer surfaces of said first and second coated fabric layers.

5. A multi-layer coated fabric according to claim 1, wherein an adhesive layer made of a polymer material with a good adhesion both to the fabric and to the sealing layer is arranged between the fabric from monoaxially drawn polymer tapes and the sealing layer.

6. A multi-layer coated fabric according to claim 1, wherein the fabric tape material has a crystallite melting point above 120° C.

7. A multi-layer coated fabric according to claim 1, wherein the sealing layer comprises polyethylene.

8. A multi-layer coated fabric according to claim 5, wherein the adhesive layer comprises polypropylene.

9. A multi-layer coated fabric according to claim 5, wherein the adhesive layer comprises polypropylene with an addition of polyethylene of up to 40% by volume.

10. A multi-layer coated fabric according to claim 5, wherein the adhesive layer has a melting point which is above that of the sealing layer.

11. A multi-layer coated fabric according to claim 1, wherein the drawn polymer tape is selected from polyolefin tapes, polyester tapes, polypropylene tapes, and polyethylene terephthalate tapes.

12. A multi-layer coated fabric according to claim 9, wherein the adhesive layer comprises polypropylene with an addition of polyethylene of up to 20% by volume.

13. A multi-layer coated fabric according to claim 1, wherein said first and second coated layers are formed into a tubular bag body from a circular fabric or a flat fabric bonded along the longitudinal edges to form a tube, wherein at least one end region of the bag body is shaped into a generally rectangular end face by folding, and comprising a cover sheet which has been bonded to the end face of the bag body using a thermoplastic synthetic material, by the exertion of heat, wherein the bag body and the cover sheet comprise a plurality of coated fabric layers.

14. A multi-layer coated fabric according to claim 13, wherein the thermoplastic synthetic material comprises a polyolefin material.

15. A multi-layer coated fabric according to claim 14, wherein the polyolefin material comprises polyethylene.

16. A multi-layer coated fabric according to claim 13, wherein the cover sheet is designed as a separate element.

17. A multi-layer coated fabric according to claim 16, wherein the bag body parts folded into an end face do not overlap each other.

18. A multi-layer coated fabric according to claim 13, wherein the cover sheet is a component of the bag body which is formed by overlapping end face tabs during the folding of the end face.

19. A bag comprising:
a tubular bag body formed from a circular fabric or a flat fabric bonded along the longitudinal edges to form a tube, wherein at least one end region of the bag body is shaped into a generally rectangular end face by folding; and
a cover sheet which has been bonded to the end face of the bag body using a thermoplastic synthetic material, by the exertion of heat, characterized in that the bag body and the cover sheet comprise said first and second coated fabric layers and said welded seam formed according to claim 1.

20. A process for manufacturing the multi-layer coated fabric according to claim 1, comprising: placing the first and second coated fabric layers with the sealing layers facing each other and heating a fabric surface opposite said sealing layer of at least one of the first or second coated fabric layers to a temperature below the crystallite melting point of the fabric tape material until the sealing layers melt.

21. A process according to claim 20, wherein the heating of the at least one coated fabric layer is performed by means of an ultrasonic actuator.

22. A process according to claim 20, wherein the heating of the at least one coated fabric layer is performed by means of a heating element.

23. A process according to claim 20, wherein the heating of the at least one coated fabric layer is performed by means of infrared radiation.

24. A process according to claim 20, wherein the heating of the at least one coated fabric layer is performed by means of a laser beam.

* * * * *